Figure 1:
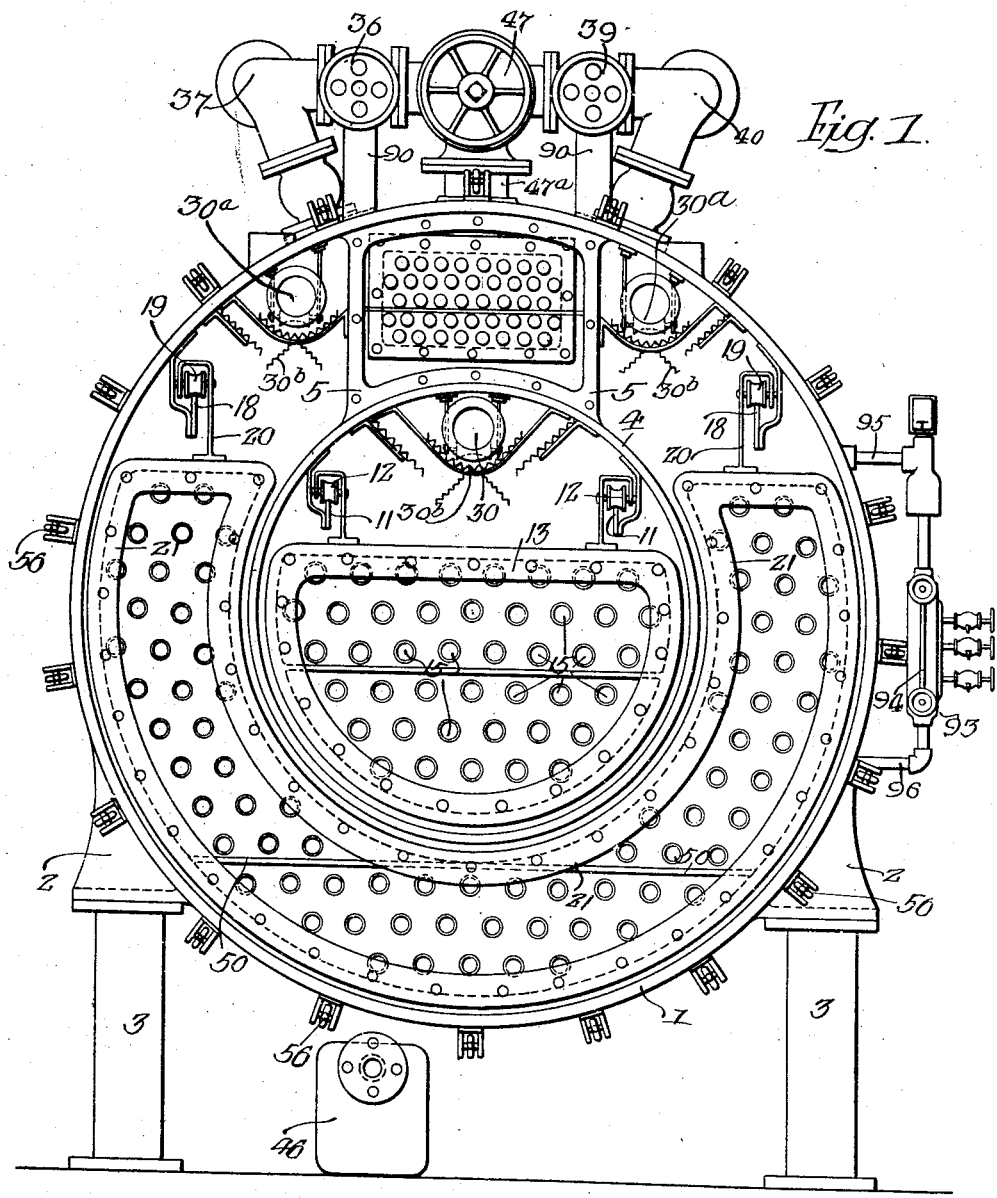

G. W. HEISSERMAN, Jr.
EVAPORATOR.
APPLICATION FILED FEB. 29, 1912.

1,045,023.

Patented Nov. 19, 1912.

8 SHEETS—SHEET 1.

Witnesses—

Inventor—
George W. Heisserman, Jr.
by his Attorneys
Howson & Howson

G. W. HEISSERMAN, Jr.
EVAPORATOR.
APPLICATION FILED FEB. 29, 1912.
1,045,023.
Patented Nov. 19, 1912.
8 SHEETS—SHEET 2.
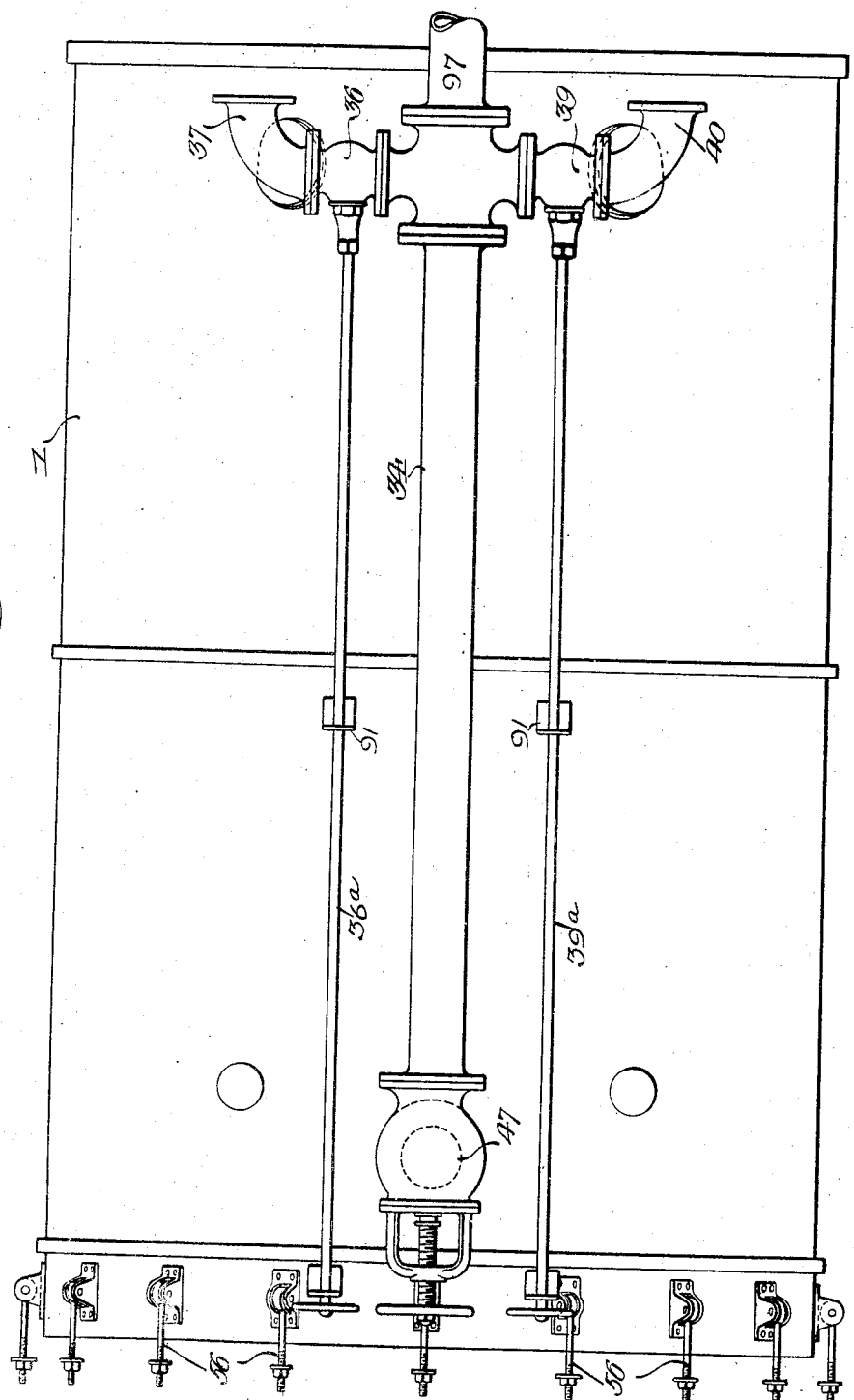

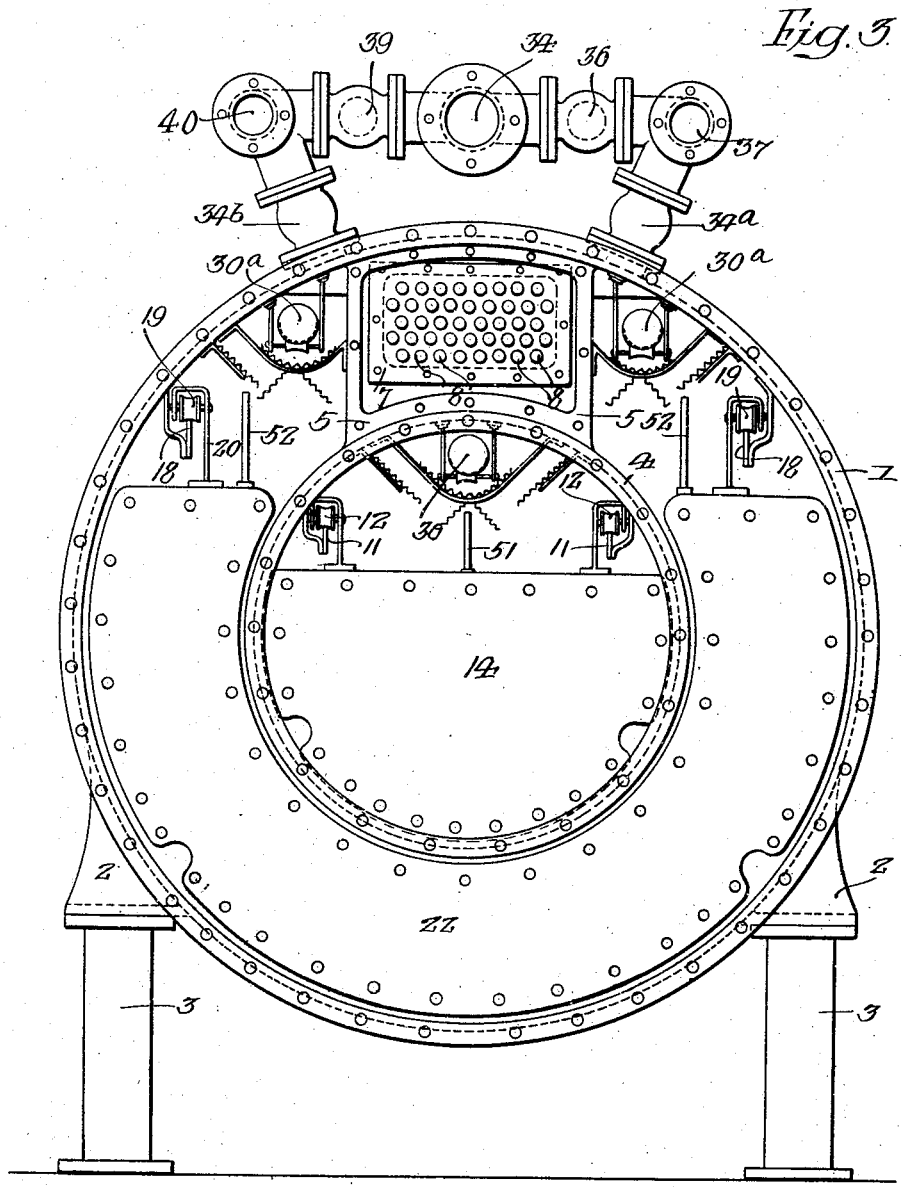

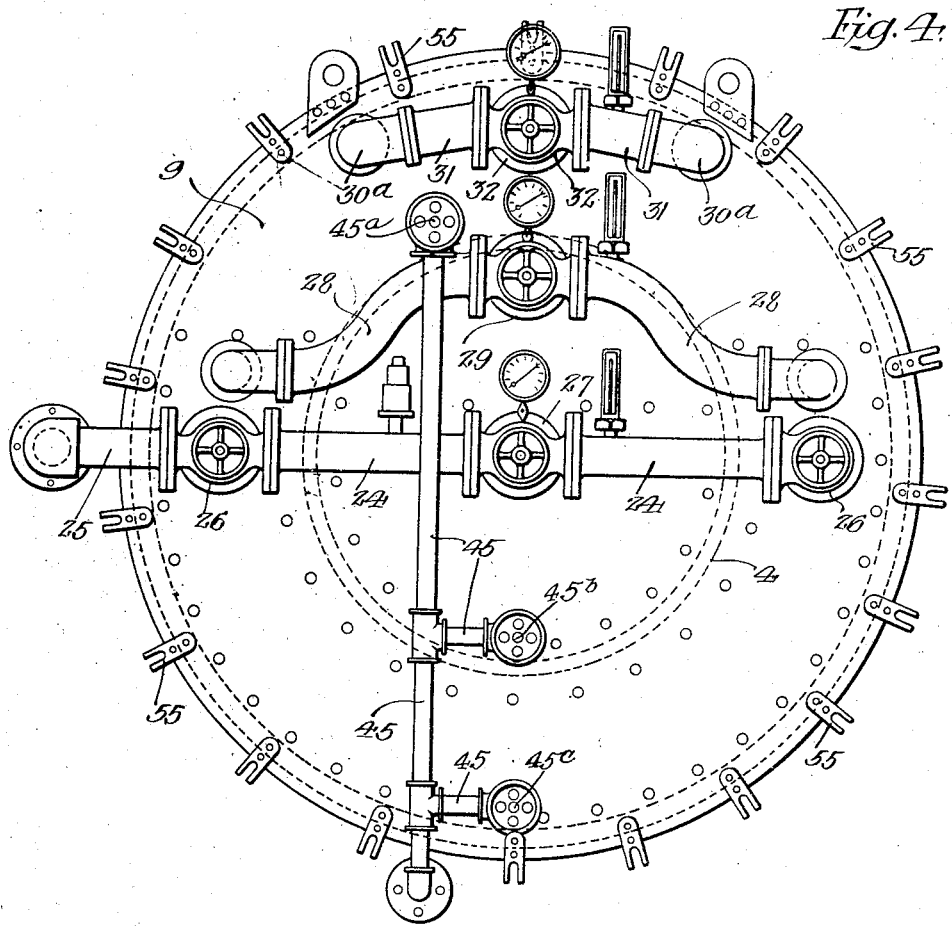

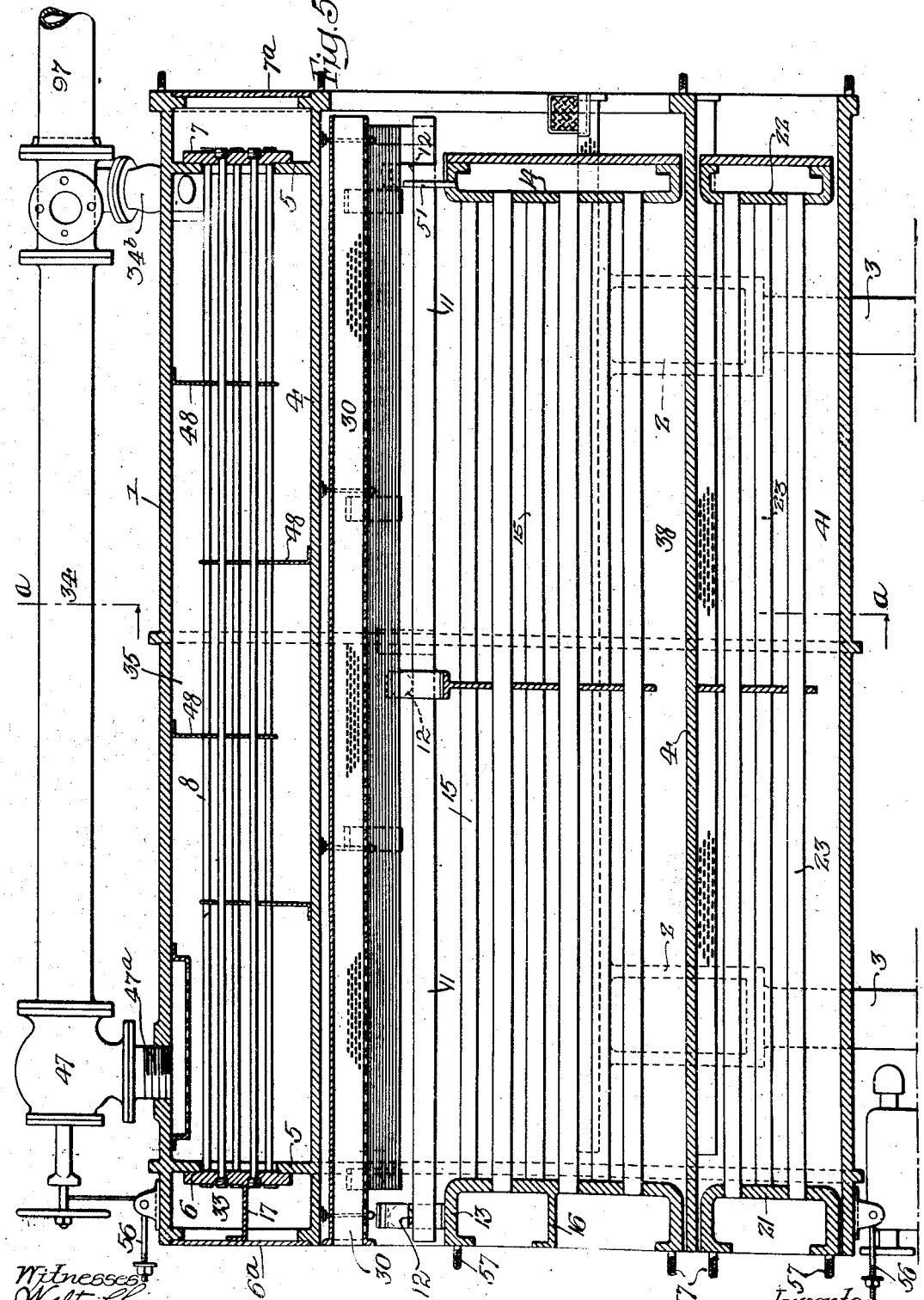

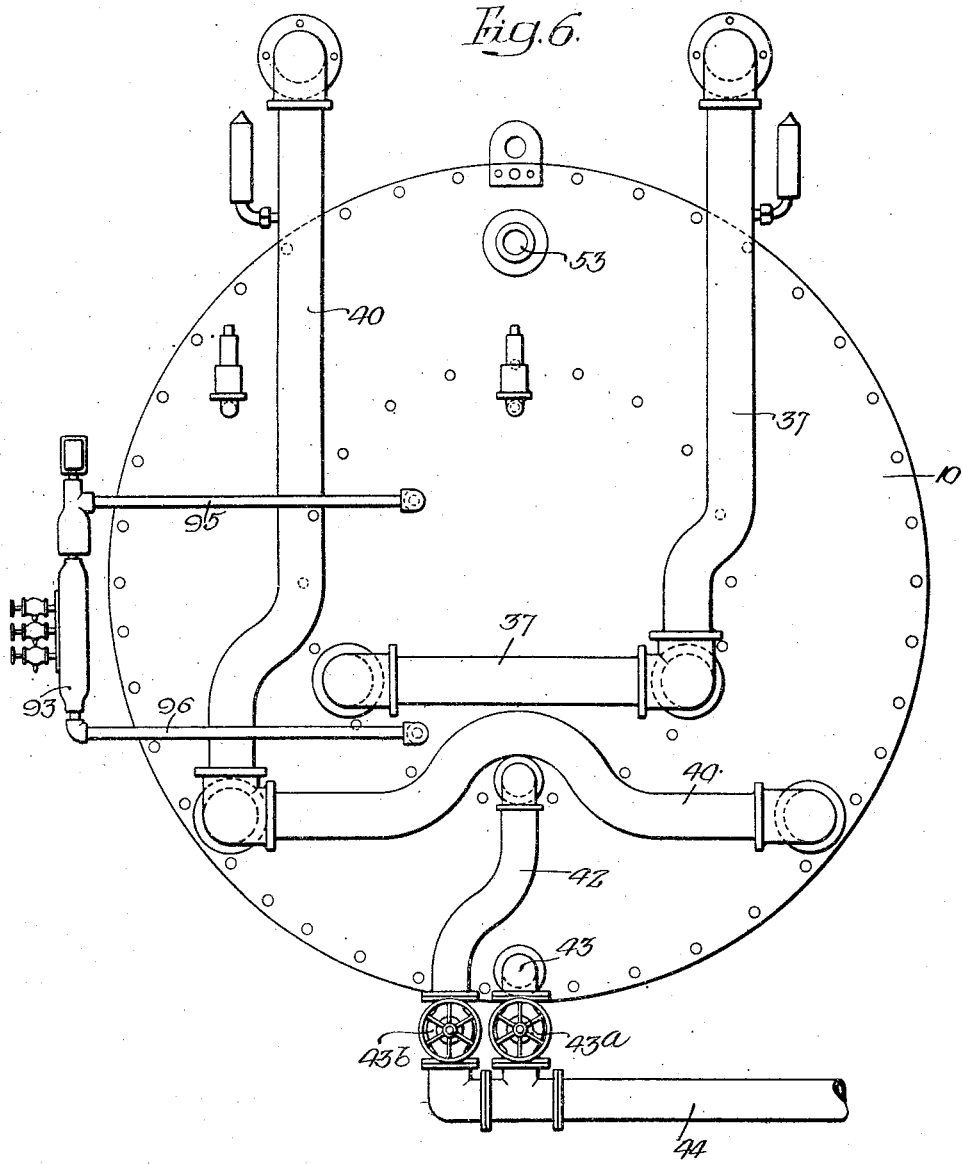

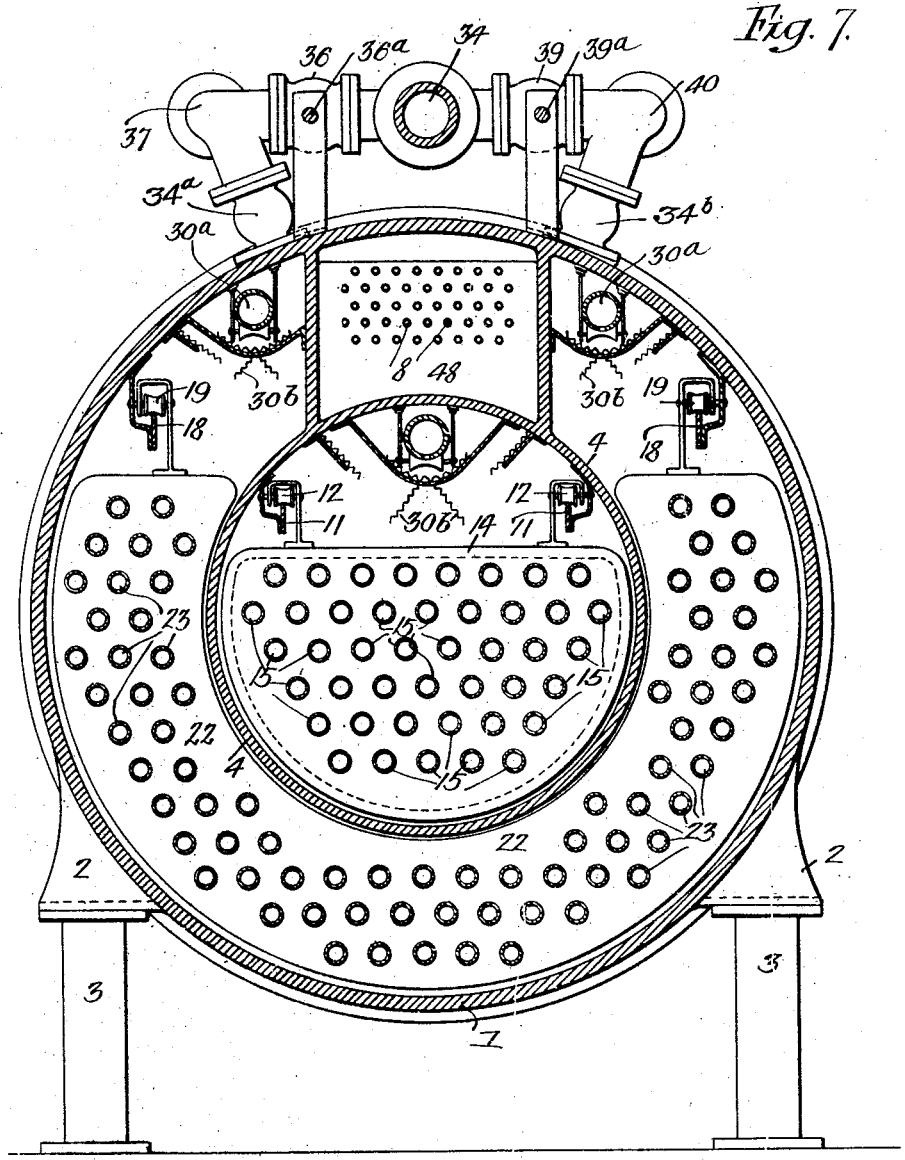

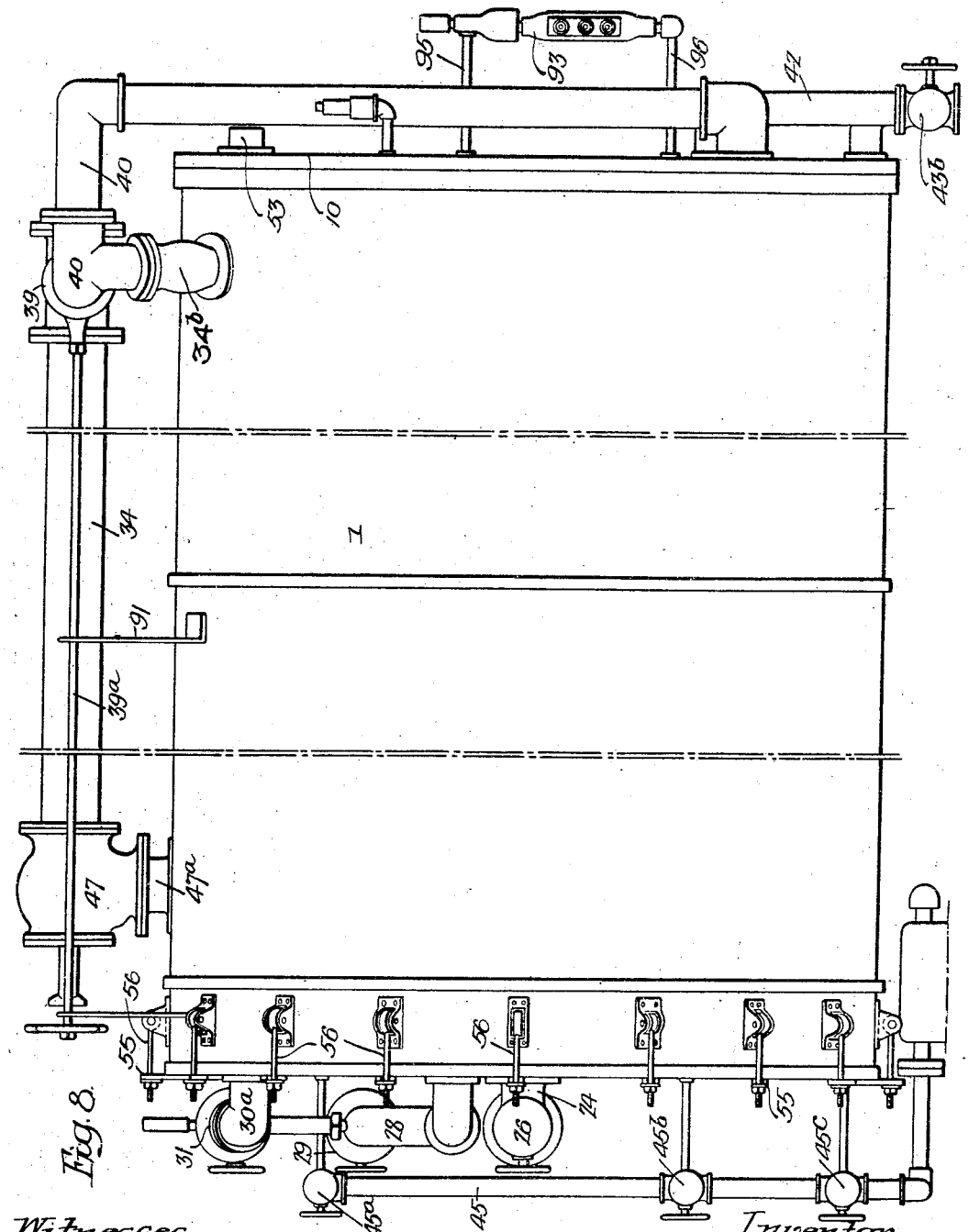

UNITED STATES PATENT OFFICE.

GEORGE W. HEISSERMAN, JR., OF PHILADELPHIA, PENNSYLVANIA.

EVAPORATOR.

1,045,023.

Specification of Letters Patent. Patented Nov. 19, 1912.

Application filed February 29, 1912. Serial No. 680,747.

*To all whom it may concern:*

Be it known that I, GEORGE W. HEISSERMAN, Jr., a citizen of the United States, residing in Philadelphia, Pennsylvania, have invented certain Improvements in Evaporators, of which the following is a specification.

One object of my invention is to provide a novel form of apparatus particularly designed for distilling sea water in order to obtain fresh water; it being especially desired that such apparatus shall be simple, easily accessible and substantial in construction, as well as efficient in operation.

It is further desired to provide an evaporator having the above noted characteristics which shall be of relatively large capacity as well as compact, and have its parts so arranged as to permit of their convenient separation for inspection or repairs; it being especially desired that the device shall be of such form and construction as will permit of its efficient use on board ships.

Another object of my invention is to provide an evaporator of above noted type with a novel arrangement of pipes and controlling valves whereby the normal operation of the apparatus as well as the operation of cracking to remove deposits of salt, may be controlled with the greatest ease.

These objects and other advantageous ends I secure as hereinafter set forth, reference being had to the accompanying drawings, in which:

Figure 1 is a front elevation of an evaporator constructed according to my invention, the front head being removed; Figs. 2 and 3 are respectively a plan and a rear elevation of the apparatus shown in Fig. 1; Fig. 4 is an elevation of the front head of the evaporator; Fig. 5 is a vertical longitudinal section of the evaporator, Fig. 6 is an elevation of the rear head of the evaporator, showing also some of the piping and valves on the main casing. Fig. 7 is a transverse vertical section on the line a—a, Fig. 5 and Fig. 8 is a side elevation of my evaporator.

In the above drawings, 1 represents the main inclosing casing of my evaporator which is provided with two pairs of lugs 2 on its opposite sides, whereby it may be supported in a substantially horizontal position by means of columns 3. Within and preferably concentric with this main casing is a second casing 4, preferably hung from the upper inside portion of said main casing by suitable hanger structures 5. This inner casing constitutes the high pressure chamber of my evaporator and immediately above this adjacent the main shell, between the hanger structures 5 is a second casing, constituting the low pressure chamber of the evaporator. This latter chamber is formed by the top portions of the main casing 1 and of the inner casing 4, tube sheets 6 and 7 and side members 6ª, Fig. 7, there being tubes 8 extending between the two tube sheets, which are spaced away from the two heads 9 and 10 of the main casing so as to form chambers. The front end of the first of these chambers is closed by a plate 6ª and the second chamber is likewise closed by a plate 7ª, both plates being mounted so as to be substantially flush with the outer face of its end of the main casing and being removably held in place by tap bolts which enter suitable counter bored recesses in said plates.

Mounted in the inner casing 4 are two parallel tracks 11, extending for practically the entire length thereof, and designed to receive rollers or flanged wheels 12 from which depend brackets carrying a removable structure comprised of front and back chambered heads 13 and 14 with a series of tubes 15 connecting the same. The header 13 has extending transversely across it a partition 16 and there is likewise a partition 17 extending across the chamber into which the front ends of the tubes 8 open, so that a portion of the latter enter said chamber above this partition while the others enter below it. Similarly there is mounted within the upper part of the main casing, a second pair of tracks 18 on which operate flanged wheels 19 supporting hangers 20, which in turn carry a structure removable from the main casing, and consisting of a pair of substantially semi-annular chambered headers 21 and 22, with a series of tubes 23 connecting the same.

The front head 9 of the main casing supports a series of pipes, as shown in Figs. 4 and 8, of which that indicated at 24 is connected at one end 25 to a source of steam and also through a valve 26 with the opposite sides of the header 21 and hence with the interiors of the tubes 23 connected thereto. In addition there is a third valve 27 through which this pipe is connected to the upper portions of the header 13 and hence with the upper ones of the series of tubes 15. A second pipe 28 is connected through a valve 29 with a dry pipe 30 supported in a suitable manner by the head 9 so as to extend longitudinally within the upper part of the inner casing 4, and rest upon rollers mounted therein; the ends of this pipe 28 being connected to opposite portions of the semi-annular casing 21 so as to be capable of delivering vapor to the upper portions of the header 21 and hence to the tubes 23 connected thereto.

In the upper part of the main casing 1, adjacent the low pressure chamber, Fig. 1, are two dry pipes or vapor collecting pipes 30' both connected to a pipe 31 Fig. 4 mounted on the front head 9 of the main casing so as to be removable therewith and communicating through a valve 32 with the upper part 33 of the header into which open the tubes of the low pressure chamber. It is to be understood that the vapor collecting pipes 30 and 30ª are provided with suitable openings to permit of the entrance of vapor and in each instance are provided with a series of corrugated or other suitably formed baffles 30ᵇ preferably mounted as shown in Figs. 1 and 3, in order that the vapor flowing to them may be compelled to take a circuitous course and thereby made to deposit any entrained particles of liquid. Said pipes are normally supported on rollers carried by the main casing so that when the head 9 is removed, these pipes which are connected to it, are also withdrawn.

Mounted on the top of the casing 1 is a water supply pipe 34 Figs. 5 and 8 whose front end is connected to deliver into liquid through a valve 47 and a pipe 47ª the interior of the low pressure chamber 35 and whose opposite end 97 is connected to any suitable pump in connection, in the present case, with a source of supply of sea water. Adjacent the rear end of the main casing 1 the pipe 34 is branched, Figs. 2 and 3, one fork having in it a valve 36 and having a connection to the low pressure chamber through a check valve 34ª. It is also connected through a pipe 37 Fig. 6 to the space in the high pressure chamber 38 surrounding the tubes 15. The other fork of the water supply pipe 34 likewise has a valve 39 which has a connection through a check valve 34ᵇ with the low pressure chamber and is also connected through a pipe 40 to the space around the tubes 23 of the intermediate chamber 41. These valves 36 and 39 are operated through valve rods 36ª and 39ª, prolonged so as to extend adjacent the front of the apparatus where they are provided with suitable handles. Brackets 90 and 91 serve to properly carry said rods.

Both the high pressure and the intermediate chambers are connected through valved pipes 42 and 43 Fig. 6 to a blow-off pipe 44, through which concentrated salt water and scale may be discharged from the evaporator. In addition, the headers 13, 21 and 33 of the high pressure, intermediate and low pressure chambers are connected to the branches of a pipe 45 leading to a fresh water trap 46; there being valves 45ª 45ᵇ and 45ᶜ for controlling the flow of liquid through said pipe as shown in Fig. 4. A suitable water column 93 with a gage glass 94 and try cocks is preferably mounted to project at one side of the main casing 1, as shown in Fig. 1, it being carried by its supply pipes 95 which are so connected through the rear head or cover 10 as to indicate the water level in the high pressure chamber 38.

Under operating conditions salt water is supplied in suitable amounts to the pipe 34, from which it passes through a valve 47 into the space around the tubes 8 within the low pressure chamber 35, being compelled to take a circuitous course from one end to the other of this chamber around the tubes 8 by means of baffle plates 48, and being heated by vapor within said tubes.

The valves 36 and 39 being closed to prevent direct flow of cold water from the supply pipe 34, portions of said partially heated liquid pass from the low pressure chamber into and through the check valve 34ª and pipe 37, Fig. 6, from whence it is delivered into opposite sides of the high pressure chamber 38 around the tubes 15; it being noted that in the case illustrated the main casing 1 is cored or otherwise so formed as to provide a passage from the check valve 34ª into the low pressure chamber, and is similarly constructed to permit of the flow of liquid between said chamber and the check valve 34ᵇ, as indicated in Fig. 3. The remainder of this liquid flows from the low pressure chamber through the check valve 34ᵇ Fig. 6 into the pipe 40 and is delivered into opposite sides of the intermediate chamber 41 around the tubes 23. Steam is delivered through the pipes 25 and 24, Fig. 4, and since the valves 26 are closed to prevent its passage into the intermediate chamber, it flows through the valve 27 into the upper part of the header 13 of the high pressure chamber, passing thence through the upper portion of the tubes 15 to the header 14. It then flows forwardly through the remainder of said tubes to the lower portion of said front header 13, being condensed by the water surrounding the pipes 15, and finally flowing as distilled water through the pipes 45 to the fresh water trap 46.

The water within the high pressure chamber, being heated by the steam is caused to generate vapor which is collected by the dry pipe 30 and through the valve 29 is delivered by the pipe 28 to opposite upper parts of the header 21, passing through the upper tubes 23 to the header 22 by reason of the partition 50 in said header and flowing forwardly in the remainder of said tubes to the lower portion of said header. This vapor is likewise condensed by reason of its passage through the cooled tubes 23, and in the form of water flows through the pipe 45 to the trap 46. This vapor however, heats the water within the intermediate chamber 41 causing it to generate vapor which is collected by the dry pipes 30ª. From these latter, said vapor is delivered through pipes 31 and the valve 32 to the upper portion of the low pressure header 33, flowing through the upper tubes 8 thereof to the space at the opposite end of the main casing and thence flowing forwardly through the lower tubes 8 to the lower portion of the front header. Owing to the cooling in these tubes, this vapor is likewise condensed and is delivered to the trap 46 through the pipe 45.

Suitable vents 51 and 52 Fig. 3 are provided for the various chambers, so that any air or gases carried into the evaporator with the water to be treated, may be free to pass from chamber to chamber until it finally reaches the space between the tube sheet 7 and the rear head 10 of the low pressure chamber, from which it is drawn through a pipe 53 to a vacuum pump.

In operating the device to remove deposits of salt from the tubes and casing structures of the high pressure and intermediate chambers, the supply of cold water is cut off by closing the valve 47 and also closing the valves 29 and 32, the valves 26 being opened. This permits the steam pressure to increase in the high pressure and intermediate chambers and when this reaches a suitable predetermined point I open the blow off valves 43ᵇ and 43ª in the pipes 42 and 43 leading from the lower portions of the water space of the high pressure and intermediate chambers to the blow off pipe 44. As a result, the pressure in these chambers falls and then said blow off valves 43ᵇ and 43ª are closed. This operation is repeated one or more times until the tubes in the spaces 38 and 41 of the high pressure and intermediate chambers are hot and dry, after which the valves 29 and 32 are opened, as are also the two valves 36 and 39 leading from the water supply pipe. This allows cold water to flow in over the tubes in the high pressure and intermediate chambers and causes the salt incrusted on these tubes to be cracked off by reason of their sudden contraction. This salt, falling to the spaces 38 and 41, Fig. 5, may then be blown off through the pipe 44 in the well understood manner. When the cool water again covers the tubes in the high pressure and intermediate chambers, the valves 36, 39 and 26 are closed and the valve 47 is opened, after which the evaporator continues operation as previously described.

From the above it will be seen that the various parts of the evaporator are compactly arranged so that it is possible to obtain a relatively large quantity of distilled water from an apparatus which occupies but relatively little space. Moreover by reason of the mounting of the vapor conducting pipes 24, 28 and 31 on the front head of the main casing, said head with said pipes may be removed with the greatest convenience merely by disconnecting the pipe 24 from the supply 25 and the distilled water pipe 45 from the trap 46. While the head may be held in place in any desired manner, I preferably provide a series of radially slotted lugs 55 designed to be engaged by hinge bolts 56 on the main casing.

After the head has been removed, the headers of the high pressure and intermediate chambers with their tubes may be taken out of the evaporator with the greatest ease, since their weight is supported from the two pairs of tracks 11 and 18. In order that the front headers 13 and 21 shall make tight joints with the head, I may provide suitable gaskets between these parts and hold said parts together by bolts indicated at 57 Fig. 5.

While in the foregoing description, I have referred to my device as an evaporator, I may without departing from my invention, use said device as a condenser or as a water heater. It is noted that in any case the only heat lost is that passing out in the distilled water and the small amount lost in radiation from the outside or main casing.

I claim—

1. The combination in an evaporator of a main casing; an auxiliary casing within the main casing, constituting a high pressure chamber; tubes within the said chamber; tubes within the chamber formed by the main casing and the auxiliary casing; with a conduit for delivering steam to the high pressure chamber; a conduit for delivering water to the chambers; means for connecting said chambers; and means for collecting distilled water from the chambers.

2. The combination in an evaporator of a main casing, two auxiliary casings within the main casing, constituting respectively low pressure and high pressure chambers and forming with the main casing an intermediate chamber; tubes in all of said chambers; vapor conducting conduits for delivering steam to the evaporator and transferring it from chamber to chamber; water conducting conduits for delivering water to the casing and transferring it from chamber to chamber; with pipes for carrying away distilled water from the evaporator.

3. The combination in an evaporator of a main casing; an auxiliary casing within the same; a series of tubes in the space between said casings; headers for said tubes; a series of tubes and headers therefor within the auxiliary casing; means for conducting steam and water to the evaporator; and means for conducting away distilled water.

4. The combination in an evaporator of a main casing; an auxiliary casing within the same forming a high pressure chamber; a low pressure chamber formed between the said two casings; a series of tubes also mounted between the two casings; a series of tubes within the auxiliary casing; headers for said tubes; means for conducting steam and water to the evaporator, and means for conducting away distilled water.

5. The combination of a main casing; an auxiliary casing mounted within the same; a third casing mounted between said two casings; a series of tubes within said third casing; a second series of tubes removably mounted in the space between the first and second casing; a third series of tubes removably mounted within the auxiliary casing; means for conducting steam and water to and through said casings, and means for collecting distilled water.

6. The combination of a main casing; an auxiliary casing in said main casing; a series of tubes in the auxiliary casing; a second series of tubes between said two casings; a removable head for the main casing; a vapor collecting pipe carried by said head and extending in to the auxiliary casing, said pipe discharging in the space between the casings; means for delivering water and steam to the apparatus and means for collecting distilled water.

7. The combination in an evaporator of a casing having a removable head and provided with a plurality of compartments; a pipe mounted on and removable with said head for conducting vapor from one compartment to another; means for delivering steam and water to the evaporator; and means for collecting distilled water.

8. The combination in an evaporator of a casing having a removable head; a track in the casing; a series of tubes permanently carried by the head; wheels for supporting said tubes from the tracks; with means for supplying water and steam to the evaporator and means for collecting distilled water.

9. The combination in an evaporator of a main casing having a removable head; an auxiliary casing mounted in said main casing; two series of tubes connected to said head and extending respectively into the auxiliary casing and into the space between the casings; tracks in the auxiliary casing and in the space between the casings; and wheels for each series of tubes for supporting the same from the tracks.

10. The combination in an evaporator of a main casing having a removable head; a plurality of auxiliary casings within the main casing; a series of tubes and a vapor collecting pipe mounted on the removable head and extending into each of the chambers formed by the auxiliary casings and the main casing; each vapor collecting pipe being connected to conduct vapor from one chamber to another; means for supplying steam and water to the evaporator; and means for collecting the distilled water.

In testimony whereof, I have signed my name to this specification, in the presence of two subscribing witnesses.

GEORGE W. HEISSERMAN, Jr.

Witnesses:
  C. N. WISE,
  CARRIE REDEKER.

---

Copies of this patent may be obtained for five cents each, by addressing the "Commissioner of Patents, Washington, D. C."